United States Patent [19]

Kondo

[11] 4,037,146

[45] July 19, 1977

[54] OUTPUT SELECTION CONTROL SYSTEM

[75] Inventor: Yoshihiko Kondo, Nagoya, Japan

[73] Assignee: Nippondenso Co., Ltd., Kariya, Japan

[21] Appl. No.: 652,854

[22] Filed: Jan. 27, 1976

[30] Foreign Application Priority Data

Jan. 29, 1975 Japan .................. 50-12710

[51] Int. Cl.² .............................. H02P 7/00
[52] U.S. Cl. .................. 318/444; 318/443;
318/DIG. 2; 307/10 R; 15/250.12
[58] Field of Search .............. 318/DIG. 2, 443, 444,
318/305; 15/250.12; 200/4, 11 C, 61.54; 307/10 R

[56] References Cited

U.S. PATENT DOCUMENTS

| | | | |
|---|---|---|---|
| 3,407,345 | 10/1968 | Fruehauf et al. | 318/443 |
| 3,487,282 | 12/1969 | Gasiorek et al. | 318/443 |
| 3,549,974 | 12/1970 | Bruegge | 318/443 |
| 3,745,362 | 7/1973 | Ballou | 200/61.54 |
| 3,883,845 | 9/1974 | Smallbone et al. | 318/305 |

Primary Examiner—Robert K. Schaefer
Assistant Examiner—Eugene S. Indyk
Attorney, Agent, or Firm—Cushman, Darby & Cushman

[57] ABSTRACT

A wiper switch of a wiper assembly includes a stopping position contact, an intermittent wiping position contact and a low-speed position contact which are respectively connected to a memory circuit, a trigger circuit and a preference circuit, wherein when the wiper switch is transferred from the stopping position to the intermittent wiping position the memory circuit generates a low level signal, whereas the memory circuit generates a high level signal when the wiper switch is transferred from the low-speed wiping position to the intermittent wiping position. A flip-flop connected to the memory circuit and the preference circuit generates a low level signal or a high level signal depending on the closing sequence of the wiper switch. The oscillation time constant of an oscillator circuit connected to the flip-flop varies depending on whether the flip-flop is generating the low level signal or the high level signal and consequently the time constant for the intermittent wiping operation of the wiper assembly varies depending on the selected closing sequence of the wiper switch.

5 Claims, 7 Drawing Figures (A1)  O → I (A2)  I → O → I (A3)  L → I → O → I (B1)  L → I (B2)  I → L → I (B3)  O → I → L → I

OUTPUT SELECTION CONTROL SYSTEM

BACKGROUND OF THE INVENTION

1. Field of the Invention

The present invention relates to an output selection control system for selectively operating a plurality of loads or selectively bringing a load having a plurality of operating conditions into its operating conditions in accordance with the selected closing sequence of a switch. More particularly, the present invention relates to a control system for controlling the operation of a vehicle wiper assembly capable of performing a low-speed wiper operation, a high-speed wiper operation and an intermittent wiper operation.

2. Description of the Prior Art

In the past, to selectively operate a plurality of loads has required the provision of as many switches (or contacts) as there are loads, while it has been the practice to selectively operate a load having a plurality of operating conditions through a variable resistance element so as to change the output modes of a single switch.

Particularly, two types of vehicle wiper assembly have heretofore been used widely, namely, one in which a manual wiper switch is provided with three operating positions for operating the wiper, i.e., the stopping, low-speed wiper operation and high-speed wiper operation positions and the other in which the manual wiper switch further includes a contact for the intermittent wiper operation in addition to the three operating positions.

To modify the known type of vehicle wiper assembly including a three-operating-position wiper switch so that the wiper assembly can additionally perform the intermittent wiping function, it is necessary to provide not only a control circuit for the intermittent wiper operation but also a separate switch for the intermittent wiper operation in addition to the above-mentioned conventional three-position wiper switch. Otherwise, it is necessary to replace the wiper switch having three operating positions with a wiper switch having four operating positions, i.e., a switch position for the intermittent wiper operation and the above-mentioned three operating positions.

On the other hand, to modify the conventional wiper assembly originally having a four-operating-position wiper switch originally provided with the function of intermittent wiper operation so that the wiper assembly can perform two intermittent wiper operating functions having two different operating time constants for the intermittent wiper operation, it is necessary to replace the wiper switch having four operating positions with a wiper switch having five operating positions, i.e., the above-mentioned four operating positions and an additional operating position.

However, the provision of a separate switch or the replacement of one switch with another is contrary to the needs of the recent years, that is, the saving of material and the effective utilization of the driver's compartment, in particular the space on the instrument panel.

In other words, the provision of a separate (independent) switch for providing the wiper assembly with an additional function of intermittent wiper operation or an additional intermittent wiper operation function for intermittently operating the wiper with different operating time constants has the disadvantage of requiring an additional space and hence giving rise to an increased manufacturing cost, whereas the replacement of a wiper switch having three operating positions with one having four operating positions or replacing a wiper switch having four operating positions with one having five operating positions gives rise to waste of material and complication of assembling process.

SUMMARY OF THE INVENTION

It is therefore an object of the present invention to provide an output selection control system which overcomes the foregoing difficulties and is simple in construction and inexpensive to manufacture.

It is another object of the present invention to provide an output selection control system wherein the closing sequence of a plurality of operating positions of an operating switch is varied to selectively operate a plurality of loads which are connected to the operating switch or suitable selectively activate a plurality of operating conditions of a single load which is connected to the operating switch.

It is still another object of the present invention to provide an output selection control system wherein the closing sequence of a plurality of operating positions of an operating switch is varied to selectively operate a load connected to the operating switch and having a greater number of operating conditions than the number of the operating positions of the operating switch.

It is still another object of the present invention to provide a control system for a vehicle wiper assembly whereby instead of replacing a conventional wiper switch of the type having four operating positions corresponding to the operating conditions of the wiper, i.e., the stopping, low-speed wiper operation, high-speed wiper operation and intermittent wiper operation, the wiper switch may be provided with an additional function of intermittent wiper operation operable with an operating time constant which is different from that of the inherently incorporated intermittent wiper operation.

It is still another object of the present invention to provide a control system for a vehicle wiper assembly whereby instead of replacing a conventional wiper switch of the type having three operating positions corresponding to the operating conditions of the wiper, i.e., the stopping, low-speed wiper operation and high-speed wiper operation, the wiper switch may be provided with an additional function of intermittent wiper operation.

DESCRIPTION OF THE PREFERRED EMBODIMENTS

The present invention will now be described in greater detail with reference to the accompanying drawings.

Figures 1, 2:
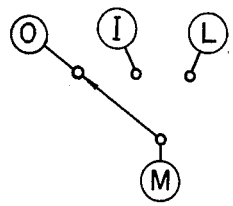
FIG. 1 is a schematic diagram of a three-position operating switch used with the present invention.
FIG. 2 is a switching sequence chart showing the various closing sequences of the operating switch shown in FIG. 1.

Referring first to FIG. 1, there is illustrated a schematic diagram of an operating switch comprising a movable contact M and three stationary contacts O, I and L which are adapted for engagement with the movable contact M, and various closing sequences (switch closing modes) for finally engaging the movable contact M with the stationary contact I are shown in FIG. 2. In FIG. 2, if the switch closing modes are represented in terms of closing sequences, there are six sequences of $A_1$, $A_2$, $A_3$, $B_1$, $B_2$ and $B_3$. The sequences $A_1$, $A_2$ and $A_3$ show the cases where the movable contact M passes through the O position just before it is moved to the I position or the final closing position, whereas the sequences $B_1$, $B_2$ and $B_3$ show the cases where the movable contact M passes through a L position just before it is moved into the I position.

Figure 3:
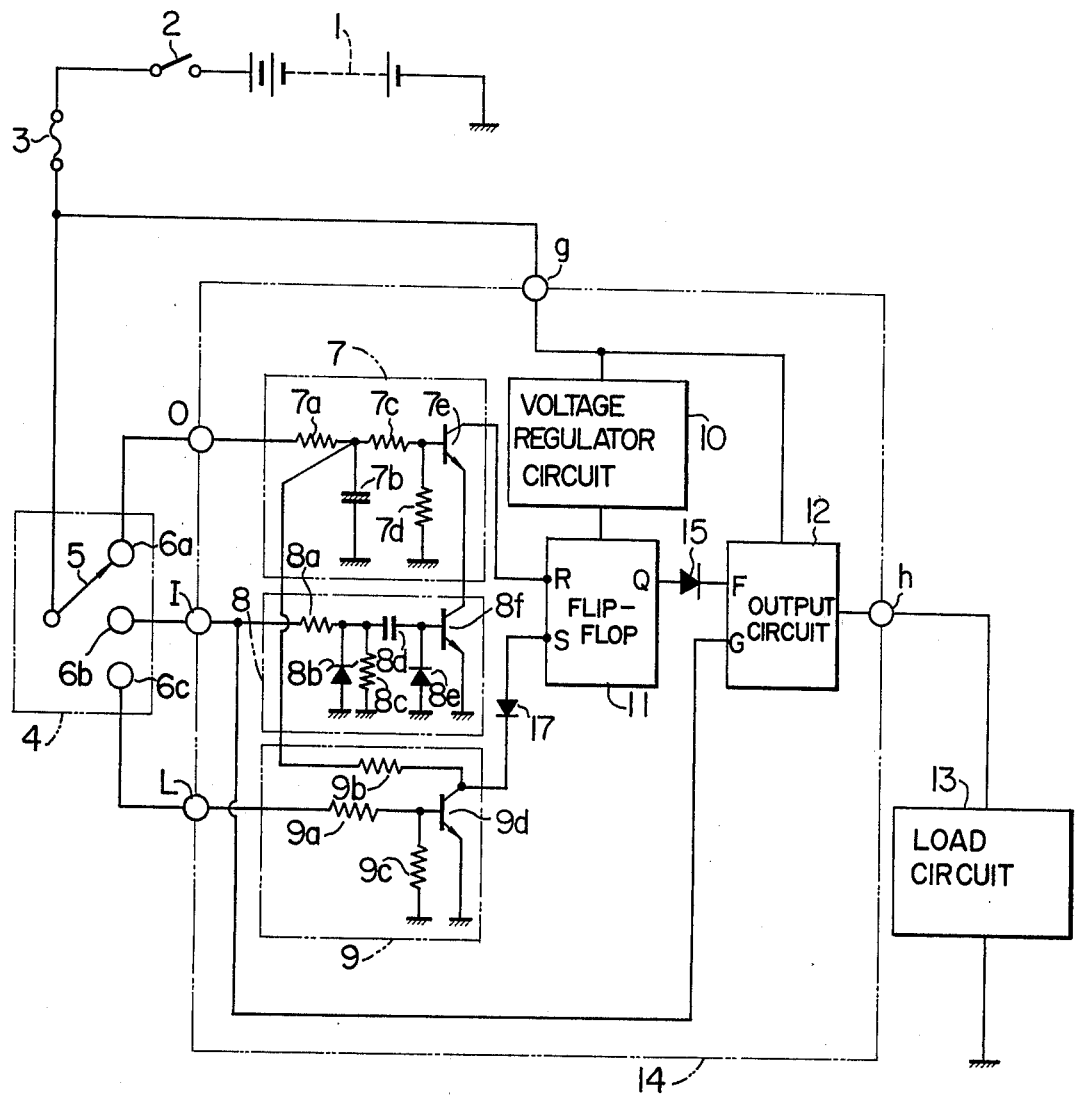
FIG. 3 is a wiring diagram showing an embodiment of an output selection control system according to the invention.

FIG. 3 is a wiring diagram showing an embodiment of an output selection control system according to the invention which employs the operating switch of FIG. 1 for selectively operating a plurality of loads. The control system comprises a DC power source 1, a main switch 2 and a fuse 3 which are connected to the DC power source 1, an operating switch 4 of the same type as described in connection with FIGS. 1 and 2 which is connected to the DC power source 1 through the main switch 2 and the fuse 3, a control circuit 14 connected to the operating switch 4 for generating an output corresponding to the selected closing sequence of the operating switch 4 and a load circuit 13 operative in response to the output of the control circuit 14.

The operating switch 4 comprises a movable contact 5 connected to the DC power source 1 through the main switch 2 and three fixed contacts 6a, 6b and 6c which are respectively connected to input terminals O, I and L of the control circuit 14.

The input terminal O is connected to a memory circuit 7 which comprises a series circuit of a resistor 7a and a capacitor 7b connected between the input terminal O and the ground, resistors 7c and 7d connected across the capacitor 7b to form one of the discharging circuits for the capacitor 7b and a transistor 7e having its base connected to the juncture of the resistors 7c and 7d. When the movable contact 5 is engaged with the first fixed contact 6a, the capacitor 7b is charged through the resistor 7a and at the same time a base current is supplied to the transistor 7e through the resistor 7c.

The input terminal I is connected to a trigger circuit 8 which comprises a resistor 8a and a Zener diode 8b which are connected between the input terminal I and the ground, a resistor 8c connected across the Zener diode 8b, a parallel circuit of a capacitor 8d and a diode 8e and a transistor 8f having its base connected to the juncture of the capacitor 8d and the diode 8e. The collector of the transistor 8f is connected to the emitter of the transistor 7e. Consequently, when the movable contact 5 is engaged with the second fixed contact 6b, the differentiated base current is applied to the transistor 8f through the capacitor 8d.

The input terminal L is connected to a preference circuit 9 which comprises resistors 9a and 9c connected between the input terminal L and the ground, a transistor 9d having its base connected to the juncture of the resistors 9a and 9c and a resistor 9b connected between the juncture of the resistor 7a and the capacitor 7b in the memory circuit 7 and the collector of the transistor 9d. When the movable contact 5 is connected to the input terminal L, the transistor 9d is turned on forming the other discharging circuit for the capacitor 7b.

The collector of the transistor 7e in the memory circuit 7 is connected to a terminal R of a flip-flop 11, the collector of the transistor 9d in the preference circuit 9 is connected to a terminal S of the flip-flop 11 through a diode 17 and an output terminal Q of the flip-flop 11 is connected to the first input terminal F of an output circuit 12 through a diode 15. The second input terminal G of the output circuit 12 is connected to the input terminal I of the control circuit 14 and the output of the output circuit 12 is applied to an output terminal h of the control circuit 14. Numeral 10 designates a voltage regulator circuit which is connected to the power source 1 through an input terminal g of the control circuit 14. The load circuit 13 is connected to the output terminal h of the control circuit 14.

While, in the wiring diagram of FIG. 3, the load circuit 13 is controlled when the movable contact 5 is finally engaged with the second fixed contact 6b, it is needless to say that the first and third fixed contacts 6a and 6c are connected to the associated load circuits (not shown) whose operations are respectively controlled when the movable contact 5 is finally engaged with the first and third fixed contacts 6a and 6c, respectively.

With the construction described above, the control system of this invention operates as follows. With the main switch 2 in its close position, when the movable contact 5 is engaged with the first fixed contact 6a, the load circuit which is now shown and connected to the fixed contact 6a is operated and controlled. At the same time, the capacitor 7b is charged through the resistor 7a and the base current is supplied through the resistor 7c to the transistor 7e thus being stood ready for conduction.

Thereafter, when the movable contact 5 is moved from the first fixed contact 6a to the second fixed contact 6b to operate the load circuit 13, the differentiated base current is supplied through the resistor 8a and the capacitor 8d to the base of the transistor 8f in the trigger circuit 8 so that the transistor 8f is turned on together with the transistor 7e of the memory circuit 7 which has previously been stood ready for conduction. This results from the fact that when the movable contact 5 is moved from the first fixed contact 6a to the second fixed contact 6b, the charge on the capacitor 7b flows (discharges) through the resistors 7c and 7d to the base of the transistor 7e in the memory circuit 7 so that the base current is supplied for a predetermined time and the transistor 7e is maintained in the conductive state for the predetermined time. Consequently, when the transistors 7e and 8f are both turned on, a low level signal is applied to the terminal R of the flip-flop 11 and a low level signal is generated at its output terminal Q. At the same time that this low level signal is applied through the diode 15 to the first input terminal F of the output circuit 12, a high level signal is applied from the input terminal I to the second input terminal G of the output circuit 12 so that the output of the output circuit 12 which is determined by the two input signals (the low level signal at the terminal F and the high level signal at the terminal G) drives the load circuit 13 into the first operating condition.

Thereafter, when the movable contact 5 is engaged with the third fixed contact 6c, the high level signal is no longer applied through the input terminal I to the second input terminal G of the output circuit 12 and consequently the load circuit 13 is brought out of operation. At the same time, the load circuit which is not shown and connected to the third fixed contact 6c is brought into operation. In the preference circuit 9 connected to the third fixed contact 6c through the input terminal L, the transistor 9d is turned on in response to the base current supplied through the resistor 9a and a low level signal is applied to the terminal S of the flip-flop 11 through the diode 17. Consequently, the signal at the output terminal Q of the flip-flop 11 goes from the low level to the high level. On the other hand, if a charge has been stored on the capacitor 7b of the memory circuit 7, due to the fact that the resistance value of the resistor 9b is selected very small, the conduction of the transistor 9d causes the stored charge on the capacitor 7b to be instantly discharged through the collector-emitter circuit of the conducting transistor 9d.

When the movable contact 5 is again moved from the third stationary contact 6c to the second stationary contact 6b, while the differentiated base current is supplied to the base of the transistor 8f of the trigger circuit 8 in the similar manner as mentioned earlier, the stored charge on the capacitor 7b of the memory circuit 7 has already been discharged through the transistor 9d of the preference circuit 9 as mentioned earlier, the transistors 8f and 7e are not turned on and they remain non-conductive. Consequently, since the high level signal has been applied and maintained at the terminal R of the flip-flop 11 so that the high level signal is generated at its output terminal Q and the high level signal is applied to the second input terminal G of the output circuit 12 through the input terminal I of the control circuit 14, the output of the output circuit 12 which is determined by the two input signals (the high level signal at the terminal F and also the high level signal at the terminal G) drives the load circuit 13 into the second operating condition. Thus, in FIG. 3, by moving the movable contact 5 from the first fixed contact 6a to the second fixed contact 6b and from the third fixed contact 6c to the second fixed contact 6b, respectively, it is possible to selectively activate the two different operating conditions of the load circuit 13.

Figure 4:
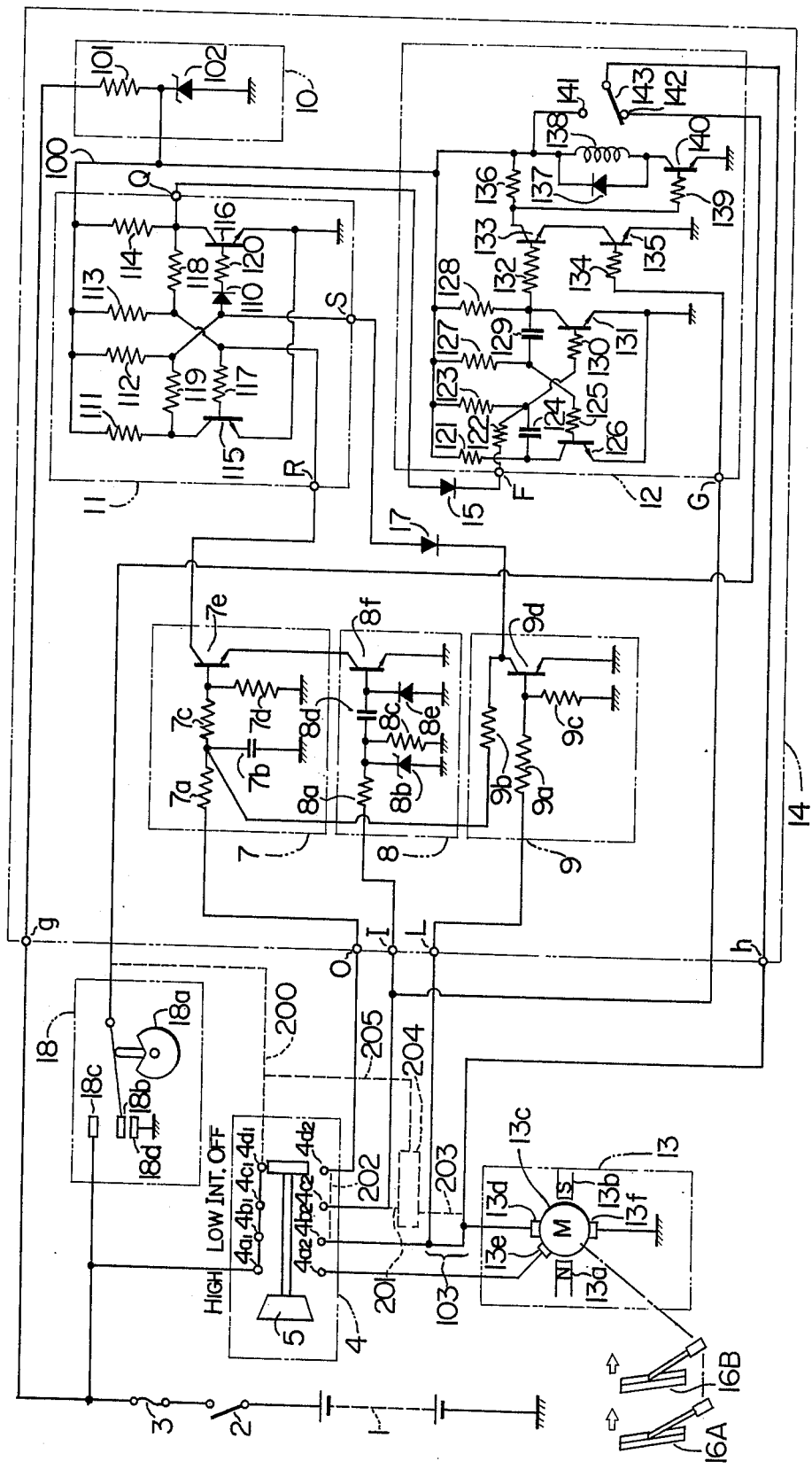
FIG. 4 is a wiring diagram wherein the output selection control system of FIG. 3 is incorporated in a conventional wiper assembly of the type having the ordinary function of intermittent wiper operation to enable the wiper assembly to perform two different types of intermittent wiping function.

Referring now to FIG. 4, an arrangement in which the present invention is applied to a vehicle wiper assembly to enable the wiper assembly to perform two different types of intermittent wiper operation will be described. In the figure, numeral 4 designates a wiper switch or operating switch comprising a manually operable movable contact 5, high-speed fixed contacts $4a_1$ and $4a_2$, low-speed fixed contacts $4b_1$ and $4b_2$, intermittent fixed contacts $4c_1$ and $4c_2$ and stopping fixed contacts $4d_1$ and $4d_2$. The high-speed fixed contact $4a_1$, the low-speed fixed contact $4b_1$, the intermittent fixed contact $4c_1$ and the stopping fixed contact $4d_1$ are connected with one another and are also connected to a power source 1 (the vehicle-loaded battery) through a fuse 3 and a main switch 2 (the key switch). On the other hand, the high-speed fixed contact $4a_2$ is connected to a high-speed brush 13e of a wiper motor 13, the low-speed fixed contact $4b_2$ is connected to a low-speed brush 13d of the wiper motor 13 and the low-speed fixed contact $4b_2$, the intermittent fixed contact $4c_2$ and the stopping fixed contact $4d_2$ are respectively connected to input terminals L, I and O of a control circuit 14. The wiper motor 13 is grounded through a brush 13f and it comprises an armature 13c and permanent magnets 13a and 13b for operating wiper blades 16A and 16B. Numeral 18 designates a wiper stopping unit comprising a cam 18a adapted for rotation in synchronism with the wiper motor 13, a movable contact 18b operated by the cam 18a, a positive side fixed contact 18c connected to the power source 1 and a fixed contact 18d connected to the ground.

The details of a memory circuit 7, a trigger circuit 8 and a preference circuit 9 of the control circuit 14 are identical with those which were described in connection with FIG. 3 and therefore they will not be described. The details of a voltage regulator circuit 10, a flip-flop 11 and an output circuit 12 of the control circuit 14 will now be described. The voltage regulator circuit 10 comprises a resistor 101 and a Zener diode 102 which are connected to the power source 1 through an input terminal g and the juncture of these elements applies a constant voltage to the flip-flop 11 and the output circuit 12 through a feeder line 100.

The flip-flop 11 comprises resistors 111, 112, 113 and 114 which are connected in parallel with the feeder line 100, a transistor 115 having its collector-emitter circuit connected in series with the resistor 111, a transistor 116 having its collector-emitter circuit connected in series with the resistor 114, a resistor 117 connected between the base of the transistor 115 and the resistor 113, a resistor 118 connected between the resistor 113 and the collector of the transistor 116, a resistor 119 connected between the collector of the transistor 115 and the resistor 112, and a resistor 120 and a diode 110 which are connected between the resistor 112 and the base of the transistor 116. The juncture of the resistors 113 and 117 is connected through an input terminal R to the collector of the transistor 7e of the memory circuit 7, and the juncture of the resistor 112 and the diode 110 is connected through an input terminal S and a diode 17 to the collector of the transistor 9d in the preference circuit 9.

The output circuit 12 comprises an astable multivibrator including resistors 121, 123, 127 and 128 connected in parallel with the feeder line 100, transistors 126 and 131 whose collector-emitter circuits are respectively connected in series with the resistors 121 and 128, a capacitor 124 connected between the collector of the transistor 126 and the resistor 123, a resistor 125 connected between the base of the transistor 126 and the resistor 127, a capacitor 129 connected between the collector of the transistor 131 and the resistor 127, and a resistor 130 connected between the base of the transistor 131 and the resistor 123. The output circuit 12 further comprises a transistor 133 having its base connected to the collector of the transistor 131 through a resistor 132, a transistor 135 having its collector-emitter circuit connected in series with the collector-emitter circuit of the transistor 133, a resistor 134 connected between the base of the transistor 135 and a second input terminal G, a resistor 136 connected between the collector of the transistor 133 and the feeder line 100, an energizing coil 138 and a transistor 140 connected between the feeder line 100 and the ground, a diode 137 connected across the energizing coil 138 for absorbing the counter electromotive force induced in the energizing coil 138, a resistor 139 connected between the base of the transistor 140 and the collector of the transistor 133, a first fixed contact 141 connected to the feeder line 100, a second fixed contact 142 connected to the movable contact 18b of the self-stopping unit 18, and a movable contact 143 which is normally in contact with the second fixed contact 142 and which is so designed that when the energizing coil 138 is operated, its electromagnetic force brings the movable contact 143 into contact with the first fixed contact 141 and connects it to the low-speed brush 13d of the wiper motor 13 through an output terminal h. The output circuit 12 further comprises a resistor 122 connected between the juncture of the resistor 123 and the capacitor 124 and a diode 15.

With the construction described above, the wiper control system operates as follows.

With the key switch 2 in the closed position, when the wiper is at rest, the operating switch 4 is in the "off" position and the movable contact 5 is in contact with the stopping fixed contacts $4d_1$ and $4d_2$. Consequently, in the memory circuit 7 connected to the fixed contact $4d_2$ through the input terminal O, the capacitor 7b is charged and the transistor 7e is standing ready for conduction.

Figure 5A:
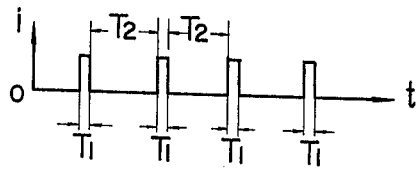
FIGS. 5(*a*) and 5(*b*) are waveform diagrams useful for explaining the operation of the wiper assemblies shown in FIGS. 4 and 6, respectively.

Thereafter, when the operating switch 4 is moved to the intermittent wiper operation position (INT), the movable contact 5 is brought into contact with the fixed contacts $4c_1$ and $4c_2$. When this occurs, in the trigger circuit 8 connected to the fixed contact $4c_2$ through the input terminal I, the differentiated base current is supplied to the base of the transistor 8f so that the transistor 8f is turned on together with the transistor 7e which has been stood ready for conduction. Consequently, a low level signal is applied to the terminal R of the flip-flop 11 so that the transistor 115 is turned off and the transistor 116 is turned on thus generating a low level signal at its output terminal Q. This low level signal is blocked by the diode 15 and thus the resistor 122 has no effect on the oscillation time constant of the astable multivibrator (121, 123, 124, 125, 126, 127, 128, 129, 130 and 131). Consequently, the astable multivibrator oscillates with a time constant determined by the resistor 123 and current flows intermittently through the collector-emitter circuit of the transistor 131 as shown in FIG. 5(a). On the other hand, the base current is supplied to the base of the transistor 135 from the fixed contact $4c_2$ through the resistor 134 placing the transistor 135 in the conductive state. Consequently, the transistors 133 and 135 are turned on only during the off times (shown at $T_2$) of the transistor 131. When the transistors 133 and 135 are turned on, the base of the transistor 140 is grounded through the resistor 139 thus placing it in the non-conductive state. On the other hand, when the transistors 133 and 135 are turned off, the transistor 140 is turned on so that current flows through the energizing coil 138 and the movable contact 143 is moved into contact with the first fixed contact 141. When the movable contact 143 is brought into engagement with the first fixed contact 141, current is supplied to the low-speed brush 13d of the wiper motor 13 through the feeder line 100, the fixed contact 141, the movable contact 143 and the output terminal h of the control circuit 14 and in this way the wiper motor 13 is brought into operation. The movable contact 143 engages with the first fixed contact 141 only during the time that the current is supplied to the energizing coil 138, that is, during the time period corresponding to a time width $T_1$ in FIG. 5(a). Thereafter, the movable contact 143 is engaged with the second fixed contact 142 and thus the current is no longer supplied to the wiper motor 13 by way of the first fixed contact 141. However, once the wiper motor 13 has been brought into operation, the cam 18a of the self-stopping unit 18 which is adapted for rotation in synchronism with the wiper motor 13, brings the movable contact 18b into engagement with the positive side fixed contact 18c so that when the movable contact 143 is engaged with the second fixed contact 142, current is supplied to the wiper motor 13 through the positive side fixed contact 18c of the wiper stopping unit 18, the movable contact 18b, the second fixed contact 142, the movable contact 143 and the output terminal h and the wiper motor 13 continues to operate. When the wiper blades 16A and 16B which are brought into wiping action by the wiper motor 13 return to their stopping positions (the lower sides of the vehicle windshield), the movable contact 18b of the wiper stopping unit 18 is brought into engagement with the grounded fixed contact 18d by the action of the cam 18a so that no current is supplied to the wiper motor 13 through any of the first and second fixed contacts 141 and 142 and the power generated by the rotation of the armature shaft 13c caused by its force of inertia is short-circuited through a closed loop including the low-speed brush 13d, the movable contact 143, the second fixed contact 142, the movable contact 18b, the fixed contact 18d, the ground and the grounded brush 13f and thus the wiper motor 13 is subjected to dynamic braking thereby rapidly stopping the wiper blades 16A and 16B at their stopping positions.

Thereafter, when the current is supplied to the energizing coil 38 again, the movable contact 143 is brought into contact with the first fixed contact 141 and the process above described is repeated thus performing the intermittent wiper operation with a time constant determined by the time period $T_2$.

On the other hand, when the operating switch 4 is moved from the intermittent wiping position (INT) to the low speed wiping position (LOW), the movable contact 5 is engaged with the low-speed fixed contacts $4b_1$ and $4b_2$. Since the fixed contact $4b_2$ is directly connected to the low-speed brush 13d of the wiper motor 13, the wiper motor 13 continuously provides a wiper wiping action. At the same time, the input terminal L of the control circuit 14 is connected to the power source 1 in response to the movement of the operating switch 4 to the low-speed wiping position (LOW) and thus the transistor 9d of the preference circuit 9 is turned on. When this occurs, if there is a stored charge on the capacitor 7b in the memory circuit 7, the stored charge is promptly discharged and a low-level signal is applied to the terminal S of the flip-flop 11 which in turn generates a high level signal at the output terminal Q.

On the other hand, the current is no longer supplied from the power source 1 to the second input terminal G of the output circuit 12 with the result that the transistor 135 remains in the non-conductive state and the energizing coil 138 remains energized bringing the movable contact 143 into engagement with the first stationary contact 141. Consequently, a lead wire 103 connecting the low-speed fixed contact $4b_2$ and the wiper motor 13 in series with each other is not always required.

Figure 5B:
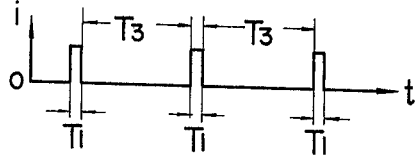

When the operating switch 4 is moved from the low-speed wiping position (LOW) to the intermittent wiping position (INT) again, through the differentiated base current is supplied to the base of the transistor 8f in the trigger circuit 8, the stored charge on the capacitor 7b of the memory circuit 7 has already been discharged and consequently both of the transistors 7e and 8f are not turned on thus causing the high level signal to remain on at the output terminal Q of the flip-flop 11. As a result, current is supplied to the juncture of the resistors 123 and the capacitor 124 of the output circuit 12 from the feeder line 100 through the resistor 114 of the flip-flop 11, the diode 15 and the resistor 122 of the output circuit 12 so that the astable multivibrator (121, 123, 124, 125, 126, 127, 128, 129, 130 and 131) oscillates with a time constant determined by the resistors 123 and 122 and current flows intermittently through the collector-emitter circuit of the transistor 131 as shown in FIG. 5(b). On the other hand, the transistor 135 is of course placed in the conductive state by the base current supplied to its base through the resistor 134. Consequently, the transistor 140 is turned on at intervals of a period $T_3$ ($T_3 > T_2$) energizing the energizing coil 138 and the movable contact 143 is engaged with the first fixed contact 141 at intervals of the time period $T_3$ thereby causing the wiper assembly to perform the intermittent wiper operation with the time constant ($T_3$) greater than the previously-mentioned time constant ($T_2$) for intermittent wiper operation.

On the other hand, when the operating switch 4 is moved to the high-speed wiping position (HIGH), the wiper assembly continuously provides the high-speed wiper operation independently of the control circuit 14.

In FIG. 4, lead wires 200, 201, 202, 203 and 205 and a block 204 which are shown with broken lines show the electric connection of a conventional wiper assembly having a function of intermittent wiper operation and the block 204 is an oscillator circuit which oscillates with a fixed time constant.

Figure 6:
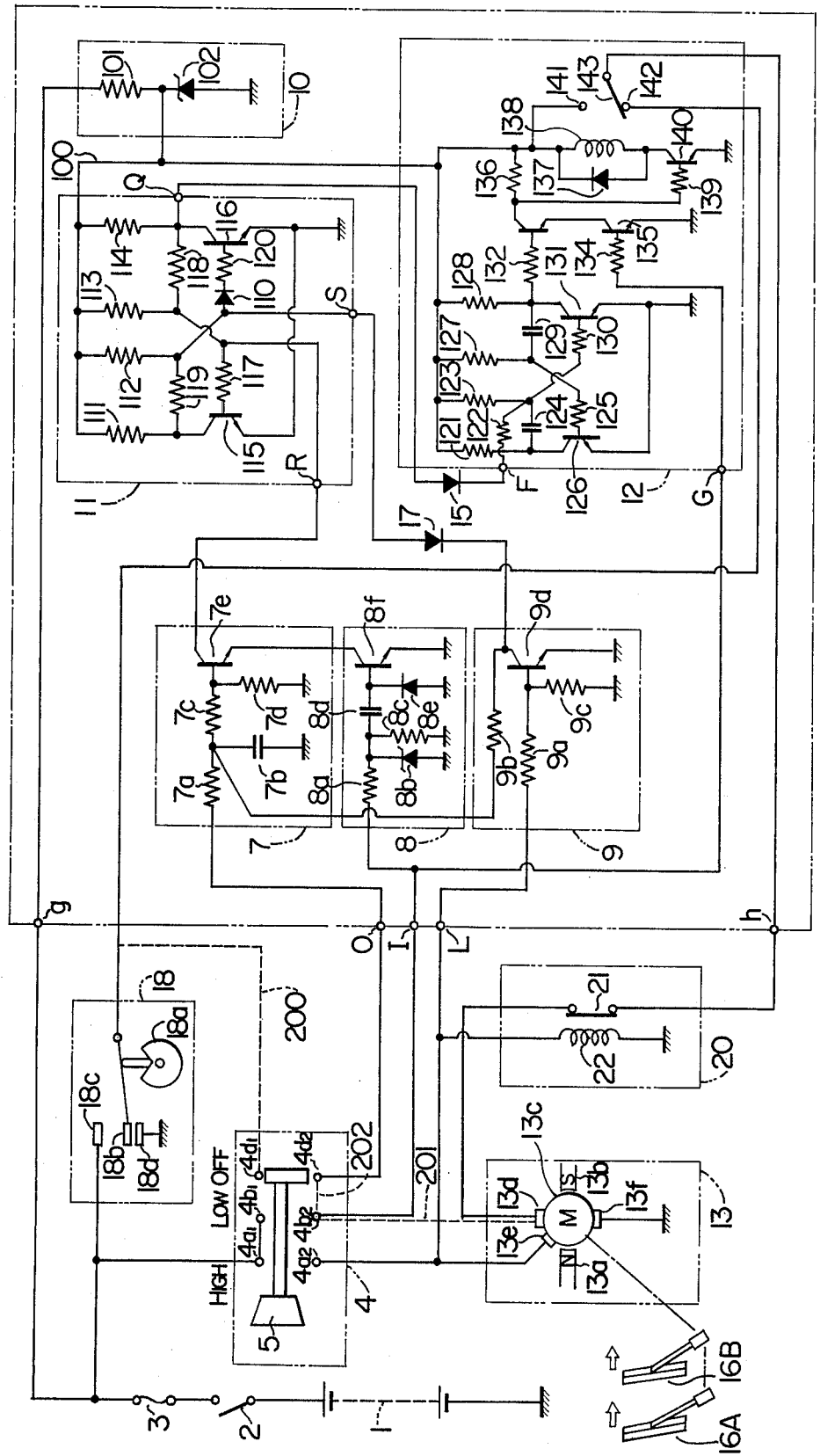
FIG. 6 is a wiring diagram wherein the output selection control system of FIG. 3 is incorporated in a conventional wiper assembly of the type having no function of intermittent wiper operation to enable the wiper assembly to perform an intermittent wiping function.

Now referring to FIG. 6, there is shown another embodiment of the invention wherein a conventional wiper assembly of the type having no function of intermittent wiper operation is provided with a function of intermittent wiper operation without replacing its operating switch. This embodiment differs from the embodiment of FIG. 4 in that the operating switch 4 is a three-position switch with the stopping (OFF), low-speed (LOW) and high-speed (HIGH) positions, the stopping fixed contact $4d_2$ is connected to the input terminal O, the low-speed fixed contact $4b_2$ is connected to the input terminal I, the high-speed fixed contact $4a_2$ is connected to the input terminal L, and a switch circuit 20 is provided between the output terminal h of the control circuit 14 and the low-speed brush 13d of the wiper motor 13. The switch circuit 20 comprises normally closed contacts 21 and an energizing coil 22 connected to the high-speed fixed contact $4a_2$ and the contacts 21 open when the operating switch 4 is placed in the high-speed wiping position (HIGH).

With the construction described above, the wiper assembly of FIG. 6 operates as follows. When the operating switch 4 is moved from the stopping position (OFF) to the low-speed wiping position (LOW), in the like manner as when the operating switch 4 was moved from the "OFF" position to the "INT" position in FIG. 4, the movable contact 143 is brought into engagement with the first fixed contact 141 at intervals of the period $T_2$. The time width $T_2$ has been preadjusted to the time required for the wiper blades 16A and 16B to move from one stopping position to the other stopping position (i.e., the time for one cycle of the wiper blade). Consequently, the wiper blades 16A and 16B are continuously operated providing the low-speed wiping action. When the operating switch 4 is moved from the low-speed wiping position (LOW) to the high-speed wiping position (HIGH), current is supplied to the energizing coil 22 of the switch circuit 20 and the normally closed contacts 21 are opened. When this occurs, the wiper motor 13 provides the high-speed wiper operation.

Thereafter, when the operating switch 4 is moved from the high-speed wiping position (HIGH) to the low-speed wiping position (LOW) again, the movable contact 143 is brought into engagement with the first stationary contact 141 at intervals of the time width $T_3$ shown in FIG. 5(b) thus providing the intermittent wiper operation.

In FIG. 6, lead wires 200, 201 and 202 which are shown with broken lines show the connection of the conventional wiper assembly having no function of intermittent wiper operation.

What is claimed is:

1. An output selection control system comprising:
    a d.c. power source (1);
    an operating switch (4) including a movable contact (5) connected to said d.c. power source and first, second and third fixed contacts (6a, 6b, 6c) operatively engageable with said movable contact (5), respectively;
    a memory circuit (7) connected to said first fixed contact (6a) for memorizing that said movable contact (5) has been engaged with said first fixed contact (6a), said memory circuit (7) including an output terminal;
    a trigger circuit (8) connected to said second fixed contact (6b) and said memory circuit (7) for causing said memory circuit (7) to generate a first signal at said output terminal thereof only when said movable contact (5) is engaged with said second fixed contact (6b) while said memory circuit (7) memorizes that said movable contact (5) of said operating switch (4) has been engaged with said first fixed contact (6a); and
    a preference circuit (9) connected to said third fixed contact (6c) and said memory circuit (7) for clearing the memory stored in said memory circuit (7) when said movable contact (5) of said operating switch (4) is engaged with said third fixed contact (6c), said preference circuit (9) having an output terminal;
    whereby said memory circuit (7) generates at the output terminal thereof a second signal different from said first signal when said movable contact (5) is engaged with said second fixed contact (6b) while said memory has been cleared.

2. A control system for a vehicle wiper assembly comprising:
    a battery (1) installed in a vehicle;
    a wiper switch (4) including a movable contact (5) connected to said battery (1), a stopping position contact ($4d_2$), an intermittent wiping position contact ($4c_2$), a low-speed wiping position contact ($4b_2$) and a high-speed wiping position contact ($4a_2$) which are operatively engageable with said movable contact (5), respectively;
    a wiper motor (13) including a low-speed brush (13d) for low-speed wiper operation, a high-speed brush (13e) for high-speed wiper operation and a grounded brush (13f), said high-speed brush (13e) being connected to said high-speed wiping position contact ($4a_2$) of said wiper switch (4), and said low-speed brush (13d) being connected to said low-speed wiping position contact (4b₂) of said wiper switch (4); and a control circuit connected to said stopping position contact (4d₂), said intermittent wiping position contact (4c₂) and said low-speed wiping position contact (4b₂) of said wiper switch (4) and said low-speed brush (13d) of said wiper motor (13), whereby when said movable contact (5) of said wiper switch (4) is moved from a stopping position to an intermittent wiping position a power is intermittently supplied from said battery (1) to said low-speed brush (13d) of said wiper motor (13) at intervals of a time width determined by a first time constant, whereas when said movable contact (5) is moved from a low-speed wiping position to said intermittent wiping position a power is intermittently supplied from said battery (1) to said low-speed brush (13d) of said wiper motor (13) at intervals of another time width determined by a second time constant different from said first time constant.

3. A wiper control system according to claim 2 wherein said control circuit comprises:

a memory circuit (7) connected to said stopping position contact (4d₂) for memorizing that said wiper switch (4) has been moved to said stopping position, said memory circuit (7) including an output terminal;

a trigger circuit (8) connected to said intermittent wiping position contact (4c₂) and said memory circuit (7) for causing said memory circuit (7) to generate a low level signal at said output terminal when said wiper switch (4) is moved from said stopping position to said intermittent wiping position;

a preference circuit (9) connected to said low-speed position contact (4b₂) and said memory circuit (7) for clearing the memory stored in said memory circuit (7) when said wiper switch (4) is moved to said low-speed wiping position, said preference circuit (9) including an output terminal, whereby a low level signal is generated at said output terminal of said preference circuit (9) when said wiper switch (4) is moved to said low-speed wiping position, whereas said trigger circuit (8) causes said memory circuit (7) to generate a high level signal at the output terminal thereof when said wiper switch (4) is moved from said low-speed wiping position to said intermittent wiping position;

a flip-flop (11) connected to the output terminal of said memory circuit (7) and the output terminal of said preference circuit (9), said flip-flop (11) being adapted to generate a low level signal when a low level signal is generated at the output terminal of said memory circuit (7), whereas said flip-flop (11) generates a high level signal when a low level signal is generated at the output terminal of said preference circuit (9);

an oscillator circuit connected to said flip-flop (11), said oscillator circuit oscillating with a first time constant when a low level signal is generated from said flip-flop (11), whereas said oscillator circuit oscillates with a second time constant greater than said first time constant when a high level signal is generated from said flip-flop (11); and a switching circuit connected to said battery (1), said oscillator circuit, said intermittent position contact (4c₂) of said wiper switch (4) and said low-speed brush (13d) of said wiper motor (13) for supplying a power from said battery (1) to said low-speed brush (13d) of said wiper motor (13) in response to the oscillation of said oscillator circuit when said wiper switch (4) is moved to said intermittent wiping position.

4. A control system for a vehicle wiper assembly comprising:

a battery (1) installed in a vehicle:

a wiper switch (4) including a movable contact (5) connected to said battery (1), a stopping position contact (4d₂), a low-speed wiping position contact (4b₂) and a high-speed wiping position contact (4a₂) which are operatively engageable with said movable contact (5), respectively;

a wiper motor (13) including a low-speed brush (13d) for low-speed wiper operation, a high-speed brush (13e) for high-speed wiper operation and a grounded brush (13f), said high-speed brush (13e) being connected to said high-speed wiping position contact (4a₂) of said wiper switch (4);

a pair of wiper blades operated by said wiper motor (13);

a control circuit connected to said stopping position contact (4d₂), said low-speed wiping position contact (4b₂) and said high-speed wiping position contact (4a₂) of said wiper switch (4) and said low-speed brush (13d) of said wiper motor (13), whereby a power is intermittently supplied from said battery (1) to said low-speed brush (13d) of said wiper motor (13) at intervals of a time width determined by a first time constant when said wiper switch (4) is moved from a stopping position to a low-speed wiping position, whereas a power is intermittently supplied from said battery (1) to said low-speed brush (13d) of said wiper motor (13) at intervals of another time width determined by a second time constant greater than said first time constant when said wiper switch (4) is moved from a high-speed wiping position to said low-speed wiping position; and self-stopping means (18) including a cam (18a) rotatable in synchronism with said wiper motor (13), a positive side fixed contact (18c) connected to said battery (1) and a grounded negative side fixed contact (18d), and a movable contact (18b) connected to said low-speed brush (13d) of said wiper motor (13), whereby when said wiper blades are started from the stopping positions thereof and set in motion said movable contact (18b) is operated and brought into contact with said positive side fixed contact (18c) by said cam (18a), whereas when said wiper blades are brought to said stopping positions said movable contact (18b) is brought into contact with said negative side fixed contact (18d) by said cam (18a);

said first time constant being selected to become equal to a time required for said wiper blades to move from one stopping positions thereof to the other stopping positions thereof, whereby said wiper blades continuously perform a low-speed wiping operation when wiper switch (4) is moved from said stopping position to said low-speed wiping position.

5. A wiper control system according to claim 4 wherein said control circuit comprises:

a memory circuit (7) connected to said stopping position contact (4d₂) of said wiper switch (4) for memorizing that said wiper switch (4) has been moved to said stopping position and including an output terminal;

a trigger circuit (8) connected to said low-speed position contact ($4b_2$) and said memory circuit (7) for causing said memory circuit (7) to generate a low level signal at the output terminal thereof when said wiper switch (4) is moved from said stopping position to said low-speed wiping position;

a preference cicuit (9) connected to said high-speed position contact ($4a_2$) of said wiper switch (4) and said memory circuit (7) for clearing the memory stored in said memory circuit (7) when said wiper switch (4) is moved to said high-speed wiping position, said preference circuit (9) including an output terminal, said preference circuit (9) generating a low level signal at the output terminal thereof when said wiper switch (4) is moved to said high-speed wiping position, whereas said trigger circuit (8) causes said memory circuit (7) to generate a high level signal at the output terminal thereof when said wiper switch (4) is moved from said high-speed wiping position to said low-speed wiping position;

a flip-flop (11) connected to the output terminal of said memory circuit (7) and the output terminal of said preference circuit (9), said flip-flop (11) generating a low level signal when a low level signal is generated at the output terminal of said memory circuit (7), whereas said flip-flop (11) generates a high level signal when a low level signal is generated at the output terminal of said preference circuit (9);

an oscillator circuit connected to said flip-flop (11) whereby said oscillator circuit oscillates with a first time constant when a low level signal is generated from said flip-flop (11), whereas said oscillator circuit oscillates with a second time constant greater than said first time constant when a high level signal is generated from said flip-flop (11); and a switching circuit connected to said battery (1), said oscillator circuit, said low-speed position contact ($4b_2$) of said wiper switch (4) and said low-speed brush (13d) of said wiper motor (13) for supplying a power from said battery (1) to said low-speed brush (13d) of said wiper motor (13) in response to the oscillation of said oscillator circuit when said wiper switch (4) is moved to said low-speed wiping position.

* * * * *